US006836727B2

(12) United States Patent
Kunigita

(10) Patent No.: US 6,836,727 B2
(45) Date of Patent: Dec. 28, 2004

(54) INFORMATION PROCESSING SYSTEM PROVIDING A SERVICE USING ELECTRONIC MAP INFORMATION

(75) Inventor: Hisayuki Kunigita, Seoul (KR)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 10/234,757

(22) Filed: Sep. 4, 2002

(65) Prior Publication Data

US 2003/0078723 A1 Apr. 24, 2003

(30) Foreign Application Priority Data

Sep. 4, 2001 (JP) ........................................ 2001-267834
Aug. 30, 2002 (JP) ........................................ 2002-252481

(51) Int. Cl.[7] ............................................. G01C 21/32
(52) U.S. Cl. ...................................... 701/208; 340/990
(58) Field of Search ................................ 701/208, 211, 701/213, 207, 201, 202, 209; 340/990, 995

(56) References Cited

U.S. PATENT DOCUMENTS

| 5,999,126 A | 12/1999 | Ito ........................... 342/357.1 |
| 6,115,611 A | 9/2000 | Kimoto et al. ............... 455/456 |
| 6,628,233 B2 * | 9/2003 | Knockeart et al. ....... 342/357.1 |
| 2001/0005809 A1 * | 6/2001 | Ito .............................. 701/210 |

FOREIGN PATENT DOCUMENTS

| JP | 10-013961 A1 | 1/1998 |
| JP | 10047982 A | 2/1998 |
| JP | 10143520 A | 5/1998 |
| JP | 10340178 | 12/1998 |
| JP | 11053376 A | 2/1999 |
| JP | 2000156882 A | 6/2000 |
| JP | 2000331006 A | 11/2000 |
| JP | 200150762 A | 2/2001 |
| JP | 2001-056805 A1 | 2/2001 |
| JP | 2001-076289 A1 | 3/2001 |
| JP | 2001119761 A | 4/2001 |
| JP | 2001134618 A | 5/2001 |
| JP | 2001-195696 A1 | 7/2001 |

* cited by examiner

Primary Examiner—Marthe Y. Marc-Coleman
(74) Attorney, Agent, or Firm—Lerner, David, Littenberg, Krumholz & Mentlik, LLP

(57) ABSTRACT

A server apparatus has an electronic map information database into which is stored electronic map data, and a spot information database into which is stored information regarding an arbitrary location in electronic map data sent from a terminal, the terminal apparatus being configured so as to enable viewing of information stored in the spot information database via an electronic network. By this configuration, it is possible for a user to store information with regard to an arbitrary location on the electronic map into the spot information database and to later verify the information stored by the user, thereby enabling the server apparatus to provide a service that suits the individual user's style.

27 Claims, 11 Drawing Sheets

FIG. 8

| TRANSFER SETTING | USER ID | 280090 |
|---|---|---|
| | SPOT INFORMATION ID | 1011 |
| | TYPE ID | III |
| | STORAGE DATE | 2001.12.1 |
| | STORAGE TIME | 17:45 |
| | PUBLIC/PRIVATE SETTING | PUBLIC |
| | RELATED DATA ID (BEFORE) | 1010 |
| | RELATED DATA ID (AFTER) | 1012 |
| | POSITION INFORMATION (LONGITUDE, x) | xx.xx.xx.xx |
| | POSITION INFORMATION (LATITUDE, y) | yy.yy.yy.yy |
| | POSITION INFORMATION (HEIGHT, z) | zz.zz.zz.zz |
| | CORRESPONDING ELECTRONIC MAP ID | JPN0042 |
| | COUNTRY NAME | JAPAN |
| | PREFECTURE (STATE) NAME | TOKYO |
| | CITY (TOWN, WARD) NAME | SHIBUYA-KU |
| | ADDRESS NUMBER | 3-3-2 SHIBUYA |
| TRANSFER ENABLE | NAME | CAFE BOHEMIAN |
| TRANSFER ENABLE | TELEPHONE NUMBER | 03-1111-1111 |
| TRANSFER ENABLE | CHARACTERISTICS | ATTRACTIVE: SURROUNDED BY GLASS WINDOWS |
| TRANSFER ENABLE | COMMENT | WENT THERE WITH AKEMI |
| TRANSFER ENABLE | STILL PICTURE DATA | (SPECIFY FILE NAME) |
| TRANSFER UNABLE | MOVIE DATA | (SPECIFY FILE NAME) |
| TRANSFER UNABLE | AUDIO DATA | (SPECIFY FILE NAME) |

INFORMATION PROCESSING SYSTEM PROVIDING A SERVICE USING ELECTRONIC MAP INFORMATION

CROSS-REFERENCE TO RELATED APPLICATIONS

This application claims priority from Japanese Patent Application Nos. 2001-267834 filed on Sep. 4, 2001 and 2002-252481 filed on Aug. 30, 2002, the disclosures of which are hereby incorporated by reference herein.

BACKGROUND OF THE INVENTION

The present invention relates to an information processing system, a terminal apparatus, a method for information processing, an information processing program, and a memory storage medium into which is stored a computer-readable information processing program, all of which are aimed at providing a service using electronic map information.

In the past, a known information processing system existed which provided a service using electronic map information, wherein a user searched for a desired destination location by operating a telecommunication terminal, the position of the extracted destination location being verifiable on an electronic map.

Such information processing systems of the past, however, were so-called provider-driven systems, in which basically all that could be done was to verify on the electronic map the position of stores and the like, which had been previously categorized by search keywords by the service provider. In such systems of the past, therefore, it was not possible, for example, to record information with regard to an arbitrary location on the electronic map, or to have the position at which information was stored verified later, thereby providing a service that suited the action patterns of the user.

SUMMARY OF THE INVENTION

Accordingly, in consideration of the above-noted problems, it is an object of the present invention to provide an information processing system, a terminal apparatus, a method for information processing, an information processing program, and a memory storage medium into which is stored a computer-readable information processing program, all of which provide a service using electronic map information that its suitable to the action patterns of a user.

In the present invention, a server apparatus providing a service using electronic map information has a spot information database into which is stored information with regard to an arbitrary location on an electronic map. The server apparatus extracts information from the spot information database to satisfy search conditions sent from a terminal apparatus, and sends the extracted information to the terminal apparatus.

According to the present invention as noted above, it is possible for a user to store information with regard to an arbitrary location on the electronic map into the spot information database and to view information that had been stored in the spot information database by specifying search conditions later, thereby providing a service using electronic map information that is suitable to the user's action patterns.

BRIEF DESCRIPTION OF THE DRAWINGS

FIG. 8 is a schematic representation showing the data format of spot information stored within the spot information database shown in FIG. 2;

DETAILED DESCRIPTION

Information Processing System Configuration

First, referring to FIG. 1, the configuration of the information processing system according to an embodiment of the present invention is as follows.

Figure 1:
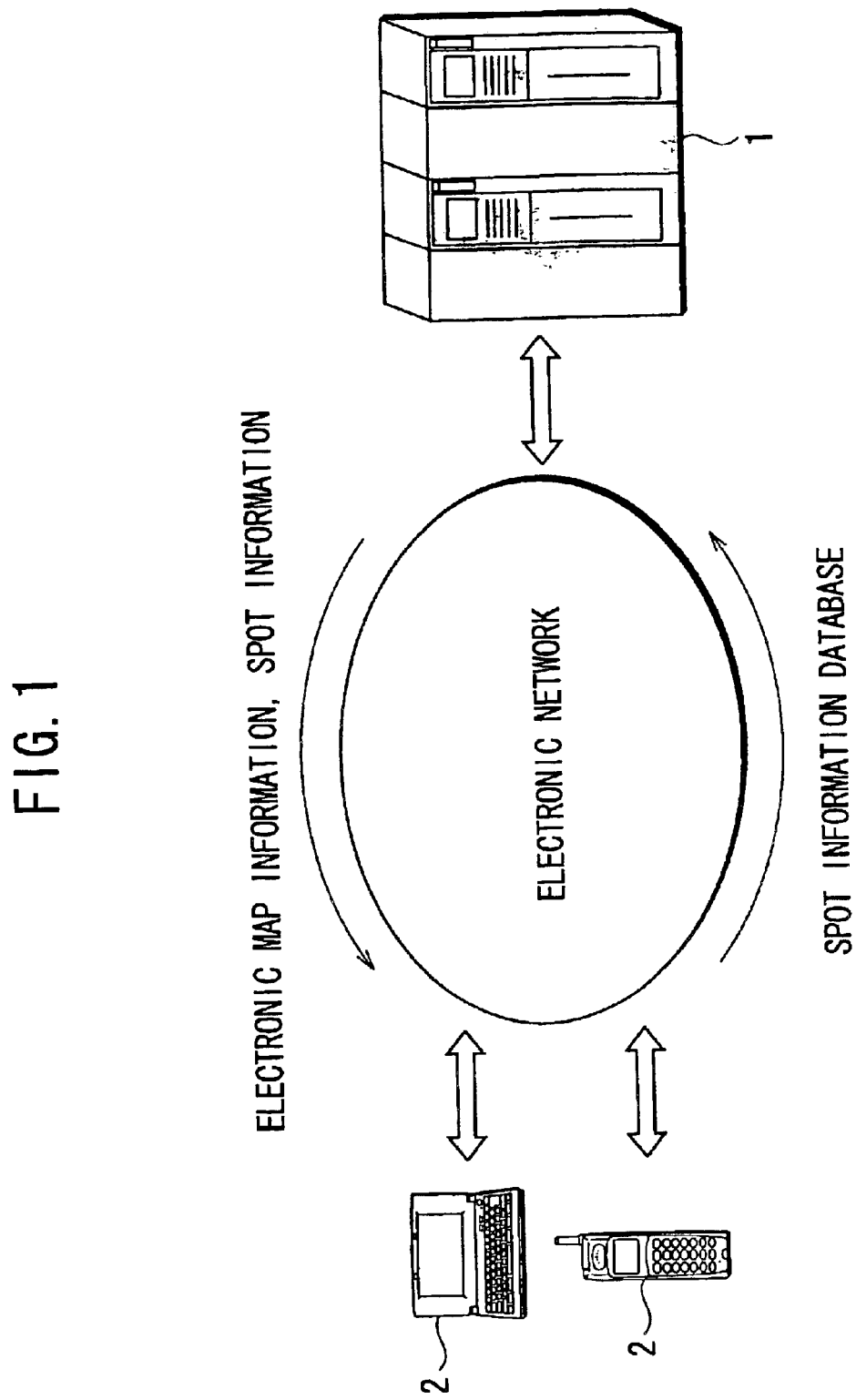
FIG. 1 is a schematic representation showing the configuration of an information processing system according to an embodiment of the present invention.

An information processing system according to an embodiment of the present invention, as shown in FIG. 1, has a server apparatus 1 which provides a service using electronic map information, and a terminal apparatus 2 operated by a user who receives the service. The server apparatus 1 and the terminal apparatus 2 are electrically connected via an electronic network, and configured so as to enable information exchange between the apparatuses.

The above-noted term "electronic network" will be understood as encompassing any information communication network making use of electrical communications technology, including a telephone circuit, an Internet system based on TCP (Transmission Control Protocol)/IP (Internet Protocol), a WAN (Wire Area Network), a LAN (Local Area Network), an optical fiber communication network, a cable communication network, and a satellite communication network and the like.

Server Apparatus Configuration

Figure 2:
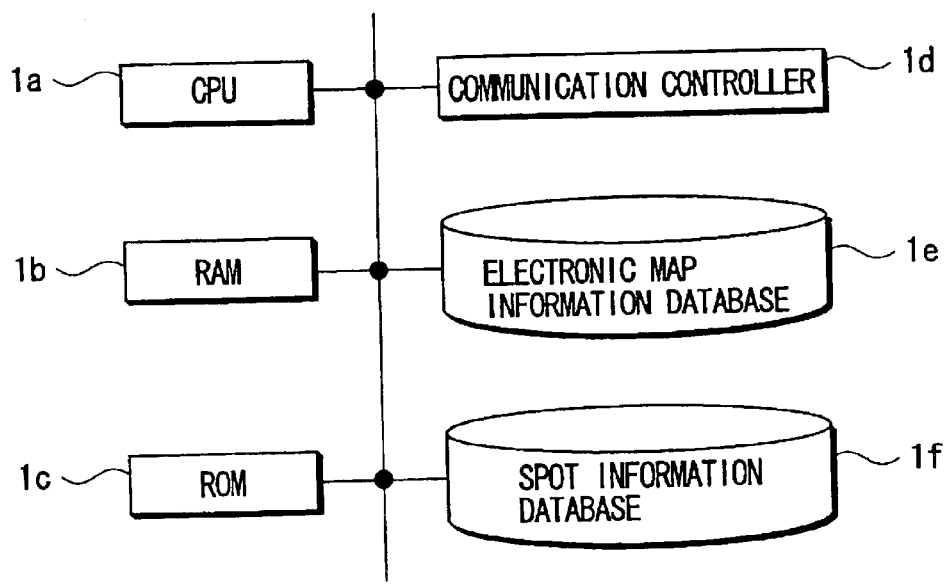
FIG. 2 is a block diagram showing the configuration of the server apparatus shown in FIG. 1.

The server apparatus 1 is formed by, for example, an information processing apparatus, such as a personal computer, a workstation, or a general-purpose computer and, as shown in FIG. 2, has a CPU 1a, a RAM 1b, a ROM 1c, a communication controller 1d, an electronic map information database 1e, and a spot information database 1f.

The CPU 1a controls processing operation of the server apparatus 1 in accordance with a program stored in the ROM 1c.

For example, the CPU 1a loads a position information/electronic map assignment program and data necessary for execution of the program stored in the ROM 1c into the RAM 1b, and executes processing so as to extract electronic map data for the area surrounding the position of the terminal apparatus 2 from within the electronic map information database 1e, in accordance with the position information/electronic map assignment program.

The above-noted RAM 1b provides a working area for temporary storage of data and a program to be executed by the CPU 1a.

The above-noted ROM 1c is used to store various programs and data required for the execution of these programs related to processing executed by the server apparatus 1, such as a startup program, a position information/electronic map assignment program, and a storage processing program, for example.

In this case, the ROM 1c is configured so as to include a storage medium that is readable by the CPU 1a, such as a magnetic or optical storage medium, or a semiconductor memory or the like, and part or all of the program and data in the ROM 1c can be downloaded via an electronic network.

The above-noted communication controller 1d has installed in it various information communication protocols in accordance with the type of electronic network. The communication controller 1d is connected to the terminal apparatus 2 in accordance with the installed information communication protocol, and sends to the terminal apparatus 2 various information in a data format in accordance with the electronic network. The communication controller 1d converts various information received via the electronic network to a data format suitable for processing by the CPU 1a.

The electronic map information database 1e stores electronic map data which is in a digital form that can be processed by the server apparatus 1 and the terminal apparatus 2. In this case, the electronic map data can be two-dimensional electronic map data comprising xy coordinates (hereinafter longitude and latitude to be defined respectively as x and y), and can alternatively be three-dimensional electronic map data by adding height-direction (z) information to two-dimensional information so as to express objects in the two-dimensional electronic map in three dimensions.

The above-noted spot information database 1f is used to store information with regard to positions on the electronic map stored beforehand by the service provider or by the creator of the electronic map data for such places as stores, post offices, and gasoline stations and the like (hereinafter referred to as default information), and further is used to store information with regard to positions on the electronic map stored by the user operating the terminal apparatus 2 via the electronic network (hereinafter referred to as spot information). Information with regard to positions stored in the spot information database 1f is linked to the electronic map data for the area in which the location exists. The configuration is such that it is possible for the service provider or electronic map data creator to update the default information at any arbitrary time.

The above-noted spot information database 1f also stores user attribute information with regard to a user who receives the service provided by the server apparatus 1. The user attribute information includes, for example, the user's name, address, telephone number, user ID, authorization password, account number for payment of service charges, and credit card number and the like. The server apparatus 1 refers to the information such as, for example, the user ID included in the user attribute information so as to distinguish between users, and provide service for a particular user.

Terminal Apparatus Configuration

The terminal apparatus 2 is an information processing apparatus capable of information communication via an electronic network, and can be implemented as, for example a portable telephone, a simple mobile telephone, or a personal data assistant (PDA).

The above-noted portable telephone encompasses portable telephones making use of the next-generation mobile telephone communications system, such as IMT-2000 (International Mobile Telecommunications 2000) or the like. The above-noted simple mobile telephone encompasses PHS (Personal Handyphone System, Japan), PCS (Personal Communication System, US), CT2 (Codeless Telecommunications second generation, UK and France), and DECT (Digital European Codeless Telecommunication, Europe), and the like.

Figure 3:
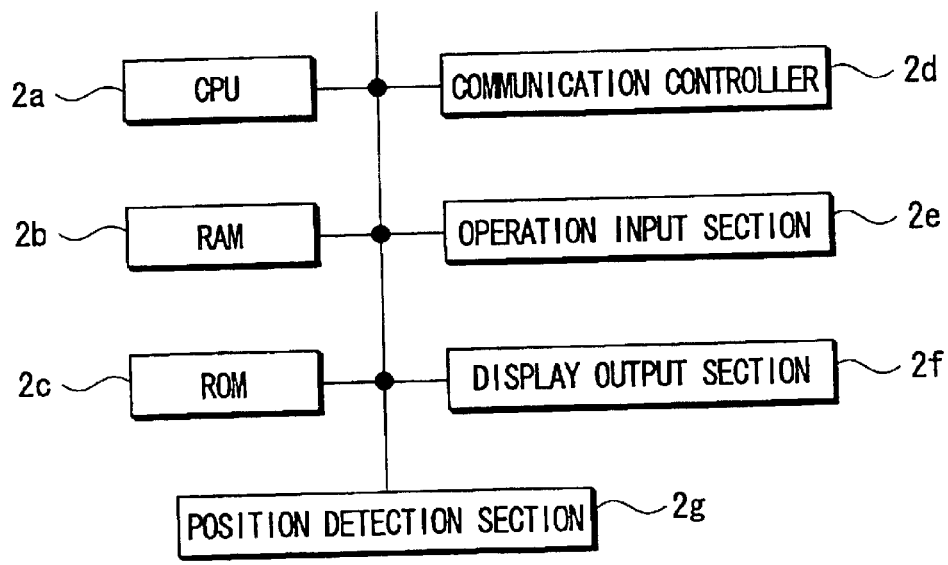
FIG. 3 is a block diagram showing the configuration of the terminal apparatus shown in FIG. 1.

The terminal apparatus 2, as shown in FIG. 3, has a CPU 2a, a RAM 2b, a ROM 2c, a communication controller 2d, an operation input section 2e, a display output section 2f, and a position detection section 2g.

The above-noted CPU 2a performs control of processing operations of the terminal apparatus 2 in accordance with a program stored in the ROM 2c.

The above-noted RAM 2b provides a working area for temporary storage of programs related to various processing executed by the CPU 2a and various data related to the programs.

The above-noted ROM 2c, similar to the ROM 1c of the server apparatus 1, includes a storage medium such as a magnetic or optical storage medium, or a semiconductor memory or the like that is readable by the CPU 2a, and the configuration can be made such that part or all of the program and data in the ROM 2c can be downloaded via an electronic network.

The above-noted communication controller 2d has installed in it various information communication protocols in accordance with the type of electronic network and the kind of the terminal apparatus 2. The communication controller 2d is connected to the server apparatus 1 in accordance with the installed information communication protocol, and sends to the server apparatus 1 various information in a data format in accordance with the type of electronic network. The communication controller 2d converts information received via the electronic network to a data format suitable for processing by the CPU 2a.

The operation input section 2e is comprised of a general type of input device, such as a ten-key pad, a keyboard, or a touch panel or the like, and outputs an input operation signal to the CPU 2a in response to operation by a user.

The display output section 2f is comprised of a general type of display output apparatus, such as a liquid-crystal display or the like, and displays various information in accordance with control from the CPU 2a.

The above-noted position detection section 2g, in accordance with control from the CPU 2a, obtains information (hereinafter referred to as position information) with regard to the latitude (x), longitude (y), and height (z) and the like, for example, of a position at which the terminal apparatus 2 exists, using at least one of a communication radio signal or GPS (Global Positioning System).

In the case in which the position detection section 2g, such as in a portable telephone or a simple portable telephone, uses a communication radio signal to perform position detection, the position detection section 2g performs communication with the nearest communication station to obtain the position information of the terminal apparatus 2.

In the case in which the position detection section 2g uses a GPS radio signal to perform position detection, a GPS receiving function is provided within the position detection section 2g. This GPS receiving function generally comprises a GPS antenna for receiving a GPS radio signal, a GPS radio section, which demodulates the received GPS radio signal, and a GPS controller, which determines and outputs latitude/longitude information of the present position by calculation from the demodulated GPS radio signal. The GPS radio receiving function receives a GPS signal, which includes a precision time signal and which is transmitted by a GPS satellite, from at least three GPS satellites existing in orbit at positions from which receiving is possible, calculates the distance to the GPS satellites from the times of arrival of the GPS radio signal from each GPS satellite, taking the point at which these distances coincide to be the current position of the receiver.

Information Processing System Operation

The above-noted information processing system can be generally broken down into three types of processing: (1) storage processing for storing spot information into the spot information database 1f of the server apparatus 1 via the electronic network, (2) spot detection processing, whereby the current position of the user is detected and, when the user is in the vicinity of a position stored by the storage processing, notification is made to the user, and (3) exchange processing, whereby spot information stored in the spot information database 1f is exchanged between users.

Spot Information Storage Processing

Referring to the flowchart shown in FIG. 4, the operation of the information processing system when executing storage processing is as follows.

Figure 4:
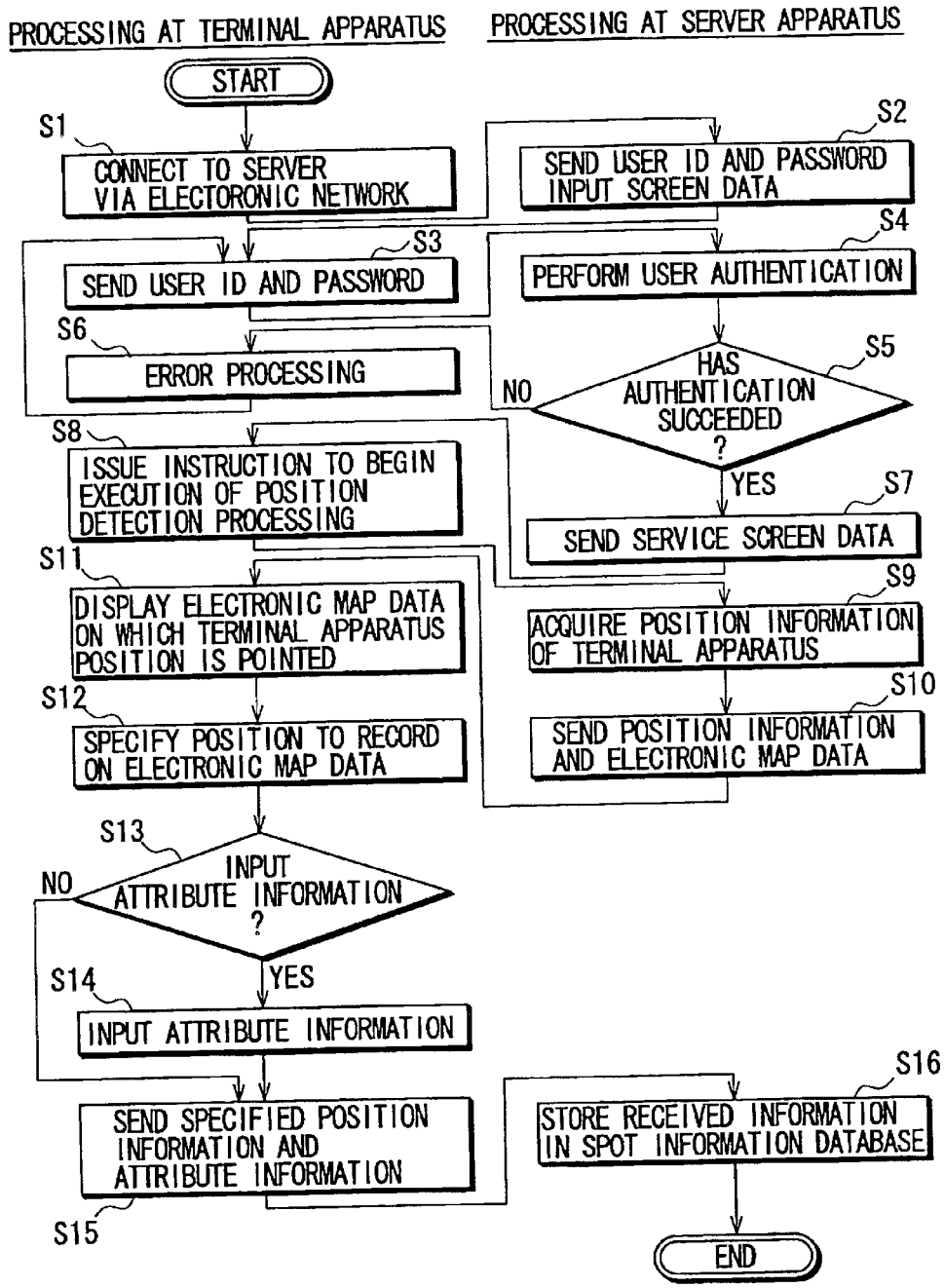
FIG. 4 is a flowchart showing the storage processing operation in the information processing system of FIG. 1.

According to the flowchart shown in FIG. 4, the user sets the power supply of the terminal apparatus 2 to on and operates the operation section 2e so as to input an execution starting command, thereby starting execution, at which point control of the storage operation transfers to the processing of step S1.

When the storage operation execution starting command is input, the user operates the operation input section 2e so that information is also sent to the terminal apparatus 2 for identification of the location of the service provider on the electronic network, this being, for example, the telephone number (access point) of the server apparatus 1, the IP (Internet Protocol) address, or the URL (Uniform Resource Locator) of the service provider.

As the processing of step S1, the communication controller 2d of the terminal apparatus 2 refers to the inputted position of the service provider on the electronic network, and makes a connection to the server apparatus 1 via the electronic network. This completes the processing of step S1, at which point control of storage processing transfers from step S1 to step S2.

As the processing of step S2, the CPU 1a of the server apparatus 1 generates data for a user ID and an authorization password input screen for authentication of the user operating the terminal apparatus 2. The communication controller 1d of the server apparatus 1 sends the thus generated input screen data to the terminal apparatus 2 via the electronic network. This completes the processing of step S2, at which point control of storage processing transfers from step S2 to step S3.

As the processing of step S3, the communication controller 2d of the terminal apparatus 2 receives the input screen data sent from the server apparatus 1 and stores the received data in the RAM 2b. When input screen data is stored in the RAM 2b, the CPU 2a controls the display output section 2f so that the user ID and authorization password input screen is displayed. When the input screen is displayed, the user operates the operation input section 2e so as to input the user ID and authorization password. When the input of the user ID and authorization password has been completed, the communication controller 2d converts the user ID and authorization password to an appropriate data format and send the user ID and authorization password to the server apparatus 1, via the electronic network. This completes the processing of step S3, at which point control of storage processing transfers to step S4.

As the processing of step S4, the communication controller 1d of the server apparatus 1 receives the user ID and authorization password sent from the terminal apparatus 2, and inputs the received user ID and authorization password into the RAM 1b. When the user ID and authorization password are input to the RAM 1b, the CPU 1a compares the user ID and authorization password stored in the spot information database 1f to those received so as to perform authorization of the user. This completes the processing of step S4, at which point control of storage control processing transfers to step S5.

As the processing of step S5, the CPU 1a of the determine whether or not the user ID and authorization password stored in the spot information database 1f is the same as the received user ID and authorization password, thereby determining whether or not the authentication of the user operating the terminal apparatus 2 succeeds and, in the case in which the authentication fails, control of the storage processing transfers from step S5 to step S6.

As the processing of step S6, the CPU 1a of the server apparatus 1 generates an error message, such as "Authentication Failed. Re-input user ID and authorization password" and the communication controller 1d of the server apparatus 1 sends the thus generated error message to the terminal apparatus 2 via the electronic network. This completes the processing of step S6. The user views the error message sent from the server apparatus 1 and performs error processing such as re-entering the user ID and authorization password, at which point control returns to step S3.

If the user authentication succeeded, however, the storage processing control transfers from step S5 to step S7.

As the processing of step S7, the CPU 1a of the server apparatus 1 generates service screen data for displaying a service menu which the server apparatus 1 provides. When this service screen data is generated, the communication controller 1d of the server apparatus 1 sends the service screen data to the terminal apparatus 2 via the electronic network. This completes the processing of step S7, at which point storage processing control transfers from step S7 to step S8.

As the processing of step S8, the communication controller 2d of the terminal apparatus 2 receives the service screen data sent from the server apparatus 1 and stores the received data in the RAM 2b. When the service screen data is stored in the RAM 2b, the CPU 2a controls the display output section 2f so as to display the service screen. When the service screen is output, the user selects the position detection menu item from the service screen, thereby issuing an instruction to start execution of detection of the position at which the terminal apparatus 2 exists. When the instruction is given to start execution of position detection, the communication controller 2d of the terminal apparatus 2 sends a position detection execution command to the server apparatus 1. This completes the processing of step S8, at which point control of storage processing transfers from step S8 to step S9.

When the above-noted position detection execution command is sent, the communication controller 2d of the terminal apparatus 2 sends information with regard to the position information acquisition method of the position detection section 2g, such as the PHS/PCS system, the IMT-2000 system, the GPS radio receiving system or the like, to the server apparatus 1 (this being expressed as a type ID). Specifically, in the cases in which the position information acquisition method is the PHS/PCS system, the IMT-2000 system, the GPS radio receiving system, the setting is made to type I, type II, or type III respectively. By receiving this type ID, the server apparatus 1 can control the position detection section 2g via the electronic network, for example, to acquire position information for the terminal apparatus 2.

Within the above-noted screen, although not illustrated, there is a "New Storage Processing" icon and a "Stored Data Search Processing" icon. When the user operates the operation input section 2e so as to select the "New Storage Processing" icon, a "Current Position Detection Processing" icon and an "Electronic Map Display Processing" icon are displayed, and when the user operates the operation input section 2e so as to select the "Stored Data Search Processing" icon, a "Location Name Input" icon and "Keyword Input" icon are displayed. In this manner, by representing processing to instruct the terminal apparatus 2 to perform by icons, it is possible to select an appropriate processing icon by operating the operation input section 2e, thereby enabling the user to simply start execution of the desired processing.

As the processing of step S9, the CPU 1a of the server apparatus 1 controls the position detection section 2g (or the CPU 2a) of the terminal apparatus 2 according to the received type ID so as to acquire position information of the terminal apparatus 2. This completes the processing of step S9, at which point control of the storage processing transfers from step S9 to step S10.

As the processing of step S10, the CPU 1a of the server apparatus 1 refers to the acquired position information, and extracts from the electronic map information database 1e electronic map data for the area surrounding the position of the terminal apparatus 2. The communication controller 1d of the server apparatus 1 sends the extracted electronic map data and position information to the terminal apparatus 2 via the electronic network. This completes the processing of step S10, at which point control of storage processing transfers from step S10 to step S11.

As the processing of step S11, the communication controller 2d of the terminal apparatus 2 receives electronic map data and position information sent from the server apparatus 1 and stores this electronic map data and position information in the RAM 2b. The CPU 2a controls the display output section 2f so as to display the electronic map data and position information stored in the RAM 2b. This completes the processing of step S11, at which point control of storage processing transfers from step S11 to step S12.

Figure 5:
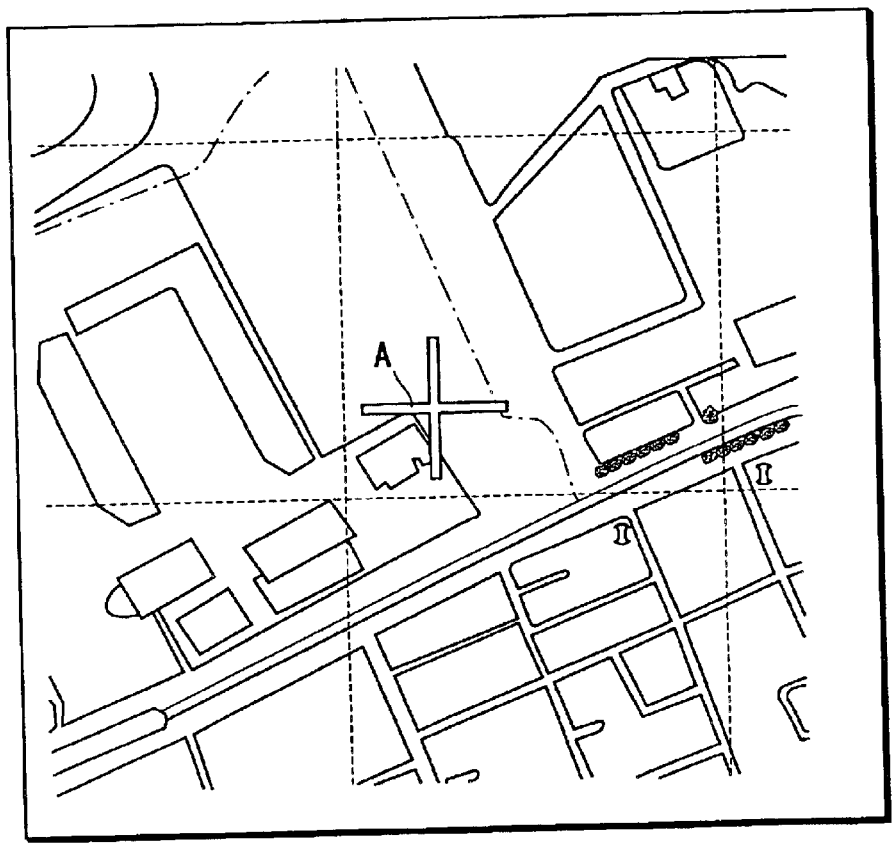
FIG. 5 is a schematic representation showing a two-dimensional electronic map displayed on the terminal apparatus shown in FIG. 1.

When electronic map data is displayed on the display output section 2f, the CPU 2a, for example as shown in FIG. 5, displays an indicator A, in the shape of a cross, at the position of the terminal apparatus 2 on the electronic map. The indicator A can be moved on the electronic map in accordance with operation by the user via the operation input section 2e. The electronic map displayed on the display output section 2f can be zoomed in or out in accordance with operation by the user via the operation input section 2e.

It will be understood that the above-noted indicator A is not restricted to the shape of a cross, and can alternatively take other shapes, for example a circle, a triangle, or other shape. Furthermore, although the electronic map shown in FIG. 5 is a two-dimensional map, it is alternatively possible to display a three-dimensional electronic map, and to display an indicator at the position of the terminal apparatus 2 on the map, taking into consideration the height-direction position. In the case of a three-dimensional electronic map, it is desirable that the configuration be such that it is possible to switch the viewing point with respect to the electronic map according to the operation by the user.

As the processing of step S12, the user refers to the position of the indicator A on the electronic map, and verifies whether or not the indicator A is at a position for which information storage is desired. If the result of this verification is that the position of the indicator A is a position for which information storage is desired, the user, for example as shown in FIG. 6, presses a selection button assigned to the operation input section 2e so as to instruct the CPU 2a to store information with regard to the position of the indicator in the spot information database 1f.

Figure 6:
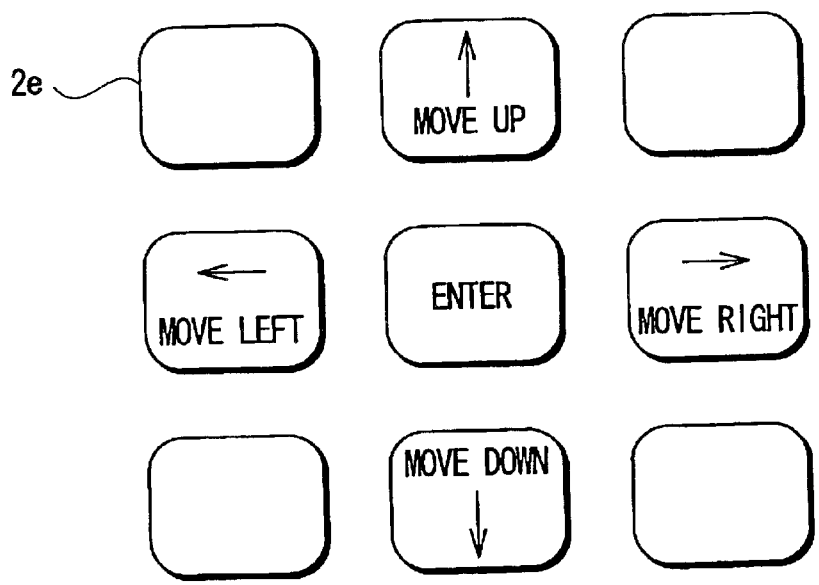
FIG. 6 is a schematic representation showing the operation input section of the terminal apparatus shown in FIG. 3.

If, however, because of error in the position detection processing or error in the electronic map the position of the indicator A is not a position for which information storage is desired, the user operates the movement buttons assigned to the operation input section 2e as shown in FIG. 6, so at to move the indicator A to a position for which information storage is desired and presses the above-noted button. This completes the processing of step S12, at which point control of the storage processing transfers from step S12 to step S13.

Figure 7:
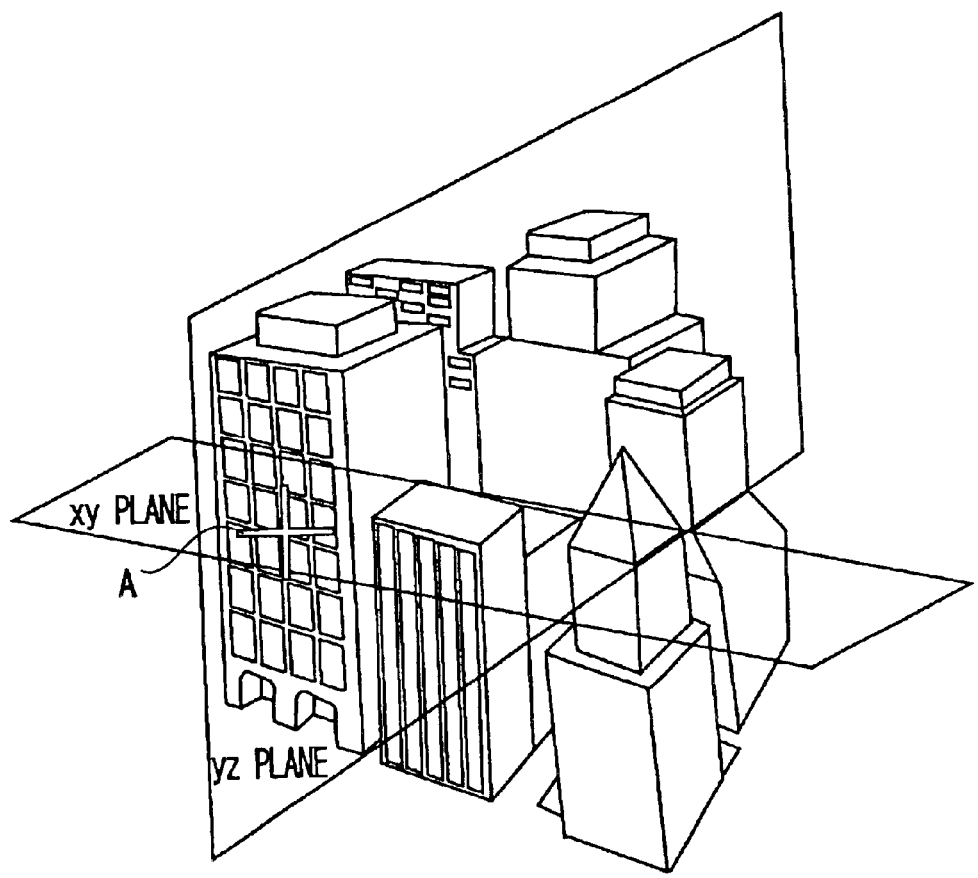
FIG. 7 is a schematic representation showing a three-dimensional electronic map displayed on the terminal apparatus shown in FIG. 1.

In the case in which the electronic map is a three-dimensional map, the user moves the indicator in three-dimensions so as to specify a position at which information storage is desired. More specifically, as shown in FIG. 7, three-dimensional data for buildings and the like on the electronic map is displayed translucently, and movement buttons assigned on the operation input section 2e are operated to independently move the indicator A in the horizontal (xy) plane and height (z) direction. By adopting this configuration, it is possible to store information for the height (z) direction as well, for example the seventh floor of the XYZ building.

As the processing of step S13, the CPU 2a controls the display output section 2f so that a message is output to verify whether or not attribute information such as the name of a building or a telephone number is to be input. In the case in which it is desired to input attribute information, the user presses the input desired button assigned to the operation input section 2e to send an instruction the CPU 2a to perform input processing for attribute information. This completes the processing of step S13, at which point control of storage processing transfers from step S13 to step S14.

If, however, it is not desired to input attribute information, the user presses a storage execution button assigned to the operation input section 2e, at which point storage processing control is transferred to step S15 without going through the processing of step S14.

As the processing of step S14, the CPU 2a controls the display output section 2f so as to successively output a sequence of messages such as "Location?", "Name?", "Telephone Number?", "Characteristics?", "Comment?", and so on, thereby requesting the user to input attribute information. When the above inquiry messages are output, the user operates the operation input section 2e so as to input in text format attribute information in response to the inquiries. This completes the processing of step S14, at which point control of storage processing transfers from step S14 to step S15.

The information regarding "Location" noted above can also be automatically input by the terminal apparatus 2 based on acquired position information. The configuration can alternatively be such that, in the case in which attribute information with regard to a position which a user attempts to input is already stored in the spot information database 1f of the server apparatus 1 as default information, the server apparatus 1 sends the default information to the terminal apparatus 2, and the terminal apparatus 2 inputs the received default information instead of the user as attribute information. According to such a configuration, the burden on the user when inputting attribute information is lightened, and the user is permitted to correct or change the default information to the desired information.

When inputting this attribute information, the user can set whether or not attribute information stored in the spot detection processing (to be described below) is to be revealed to other users (this being referred to as public/private setting).

In the case in which the terminal apparatus 2 has a function that allows the storage of static image or movie image data, or audio data, the user can be permitted to include the image or audio data in the attribute information, in which case the CPU 2a at the terminal apparatus 2 either before or after storing attribute information outputs a verification message, for example "Store image/audio?" and when the user wishes to store such data, controls the display output section 2f so as to display such icons as an "Image" or "Audio" icon. If the user selects the "Image" icon, image data input via an image input apparatus equipped with or connected to the terminal apparatus 2 is included in the attribute information. If the user selects the "Audio" icon, audio data input via an audio input apparatus equipped with or connected to the terminal apparatus 2 is included in the attribute information. This processing is completed by pressing an "End" button assigned on the operation input section 2e. When performing this processing, if necessary the image or audio data captured in the terminal apparatus 2 can be played back so as to have the user verify whether or not it is the correct content.

As the processing of step S15, the CPU 2a of the terminal apparatus 2 formats the input attribute information and user-specified information regarding position on the electronic map into a format such as shown in FIG. 8, and the communication controller 2d sends the formatted information to the server apparatus 1 via the electronic network. This completes the processing of step S15, at which point control of the storage processing transfers from step S15 to step S16.

The formatted information, as shown in FIG. 8, includes such data as user ID, spot information ID, terminal apparatus 2 type ID, storage date, storage time, public/private setting, related data IDs (before) (after), position information (longitude (x), latitude (y), height (z)), corresponding electronic map ID, country name, prefecture (state) name, city (town, borough) name, address number, name, telephone number, characteristics, comment, static image data, movie image data, and audio data. The user makes a setting for each of the items in the formatted information, which establishes whether or not the that item will be permitted to be transferred to another user at the time of spot information exchange processing, which is described later.

Of this formatted information, the spot information ID is left blank when the formatted information is transmitted to the server apparatus 1. After receiving the formatted information, the server apparatus 1 assigns a spot information ID and registers the assigned spot information ID into the formatted information.

In newly registering a spot information ID, the server apparatus 1 registers the spot IDs before and after as the related data IDs (before) (after) of the formatted information. Specifically, in newly registering a spot information ID, the server apparatus 1 registers the newly registered spot information ID as the related data ID (after) of the spot information immediately before. Similarly, the server apparatus 1 registers the newly registered spot information ID as the related data ID (before) of the spot information immediately after.

Although the present explanation is described as the related data ID is assigned by the server apparatus 1, user may rearrange the registered spot information and replace (or modify) the related data ID. In this case, the user copies to the related data ID of other spot information a spot information ID to be associated with by operating his or her terminal apparatus 2. Then, the user transmits and registers the content of the modification to the server apparatus 1. According to such a processing, user can associate arbitrary spot information, such as associating previously registered spot information about "Central Park" with future registered spot information about "shops around the Central Park".

Although the present explanation is described as the related data ID is connected in one dimension, the related data ID may be connected derivatively such as a tree structure. According to such a processing, the spot information can be associated more systematically.

In the case in which attribute information is not input, the data fields after the name are left blank. Of this formatted information, part or all of the user ID, terminal apparatus 2 type ID, storage date, storage time, position information (longitude (x), latitude (y), height (z)), corresponding electronic map ID, country name, prefecture (state) name, city (town, borough) name, address number, name, and telephone number are input automatically by the terminal apparatus 2. Further, public/private setting can be done for each of the item in the formatted information.

Figure 9:
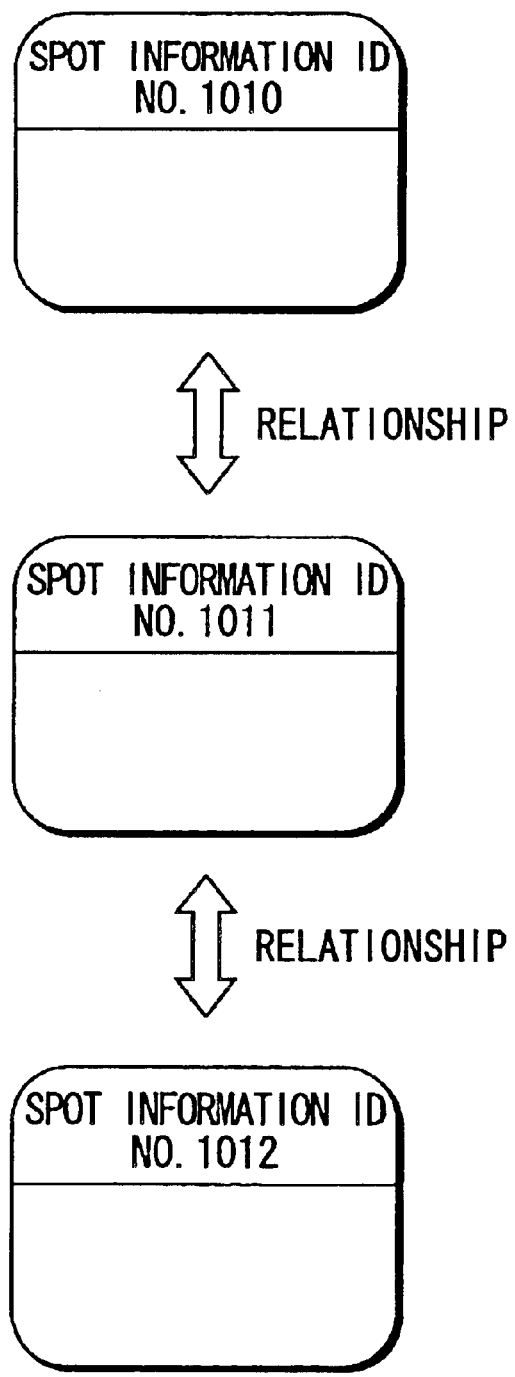
FIG. 9 is a schematic representation illustrating the method of using spot information according to an embodiment of the present invention.

The related data ID (before) and related data ID (after) noted above are areas used to store ID numbers of spot information related to spot information to be stored. By providing these storage areas, it is possible to store a plurality of spot information in the spot information database 1f, as shown in FIG. 9, with a relation established therebetween, and this function enables the following types of processing:

(1) Continuous storage of spot information by the user, and use of the related data IDs to form a group of the plurality of spot information as a time series.

(2) Automatic execution of position detection processing at a prescribed time interval, and use of the related data IDs to form a group of the continuous position history.

According to the above-noted processing types (1), it is possible for the user, for example, to easily create a electronic diary with an electronic map. Because this spot information is all held in the server apparatus 1, there is no undue burden placed on the hardware resources in the terminal apparatus 2, and it is further possible for the user to view the electronic diary on his or her home computer. Furthermore, according to the above-noted processing types (2) because it is possible for another user to verify from his or her home computer the position or movement history of a user carrying a terminal apparatus 2, it is possible, for example, to provide a service whereby the family of a child that is made to carry the terminal apparatus 2 is notified when the spot information storage is interrupted.

Although the present invention is described as executing the above-noted processing based on an a related data ID, it will be understood that it is alternatively possible to perform the above-noted processing based on the storage date or time that is included in the formatted information, according to which method it is possible to eliminate the need for the user to input related data ID.

As the processing of step S16, the communication controller 1d of the server apparatus 1 receives the formatted data sent from the terminal apparatus 2 and stores the received formatted information in the RAM 1b. The CPU 1a stores the formatted data in a storage area in the spot information database 1f corresponding to the user ID of the formatted information. This completes the processing of step S16, thereby completing the overall series of processing steps to perform storage processing.

Spot Detection Processing

Referring to the flowchart of FIG. 10, the operation of the information processing system when performing spot detection processing is as follows.

Figure 10:
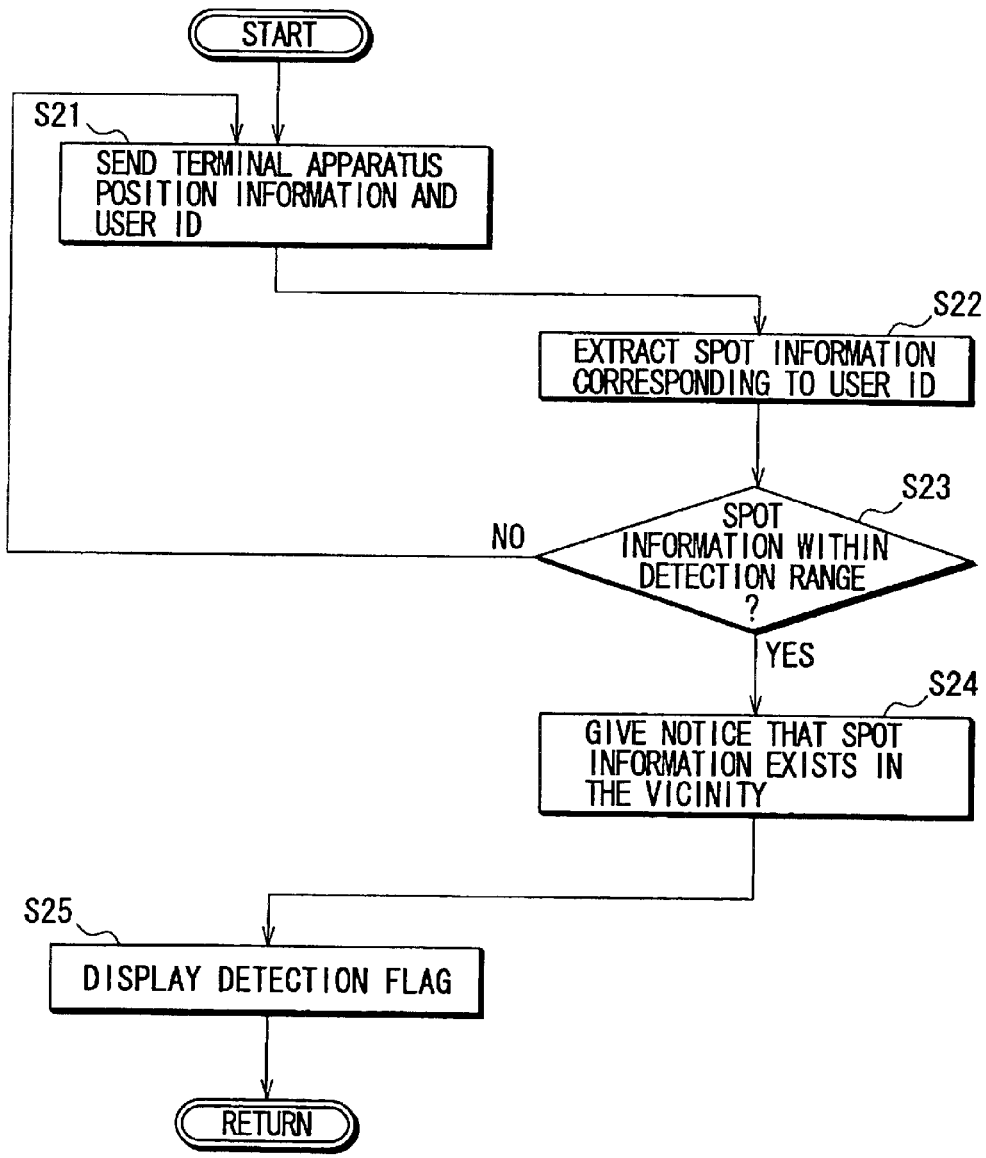
FIG. 10 is a flowchart showing the spot information detection processing operation according to the information processing system shown in FIG. 1.

According to the flowchart shown in FIG. 10, when the user sets the power supply of the terminal apparatus 2 to on and sets the terminal apparatus 2 to the "automatic detection mode," control of processing is transferred to step S21. The automatic detection mode, as used herein, refers to a processing mode in which the above-noted spot detection processing provided in the terminal apparatus 2 can be executed, and enabling this mode permits the execution of the processing steps described below. The terminal apparatus 2 can be alternatively configured so as to not have an automatic detection mode, in which case the following described processing steps are performed as long as the power is applied to the terminal apparatus 2.

As the processing of step S21, the position detection section 2g of the terminal apparatus 2 acquires position information for the terminal apparatus 2, and sends the position information, together with the user ID of the terminal apparatus 2 to the server apparatus 1, via the electronic network. This completes the processing of step S21, at which point control of spot detection processing transfers from step S21 to step S22.

The user can be made to input the user ID each time the automatic detection mode is set, and it is alternatively possible to store the user ID in the ROM 2c beforehand, and to have the CPU 2a read the user ID from the ROM 2c when the position information is sent.

As the processing of step S22, the communication controller 1d of the server apparatus 1 receives the position information of the terminal apparatus 2 and the user ID, and stores the received position information and user ID in the RAM 1b. The CPU 1a of the server apparatus 1 then extracts from the spot information database 1f spot information stored by the user corresponding to the user ID stored in the RAM 1b. This completes the processing of step S22, at which point control of the spot detection processing transfers from step S22 to step S23.

As the processing of step S23, the CPU 1a refers to the position information of the terminal apparatus 2 stored in the RAM 1b and the extracted stored information, and determine whether or not the position of the extracted spot information is within a prescribed range from the terminal apparatus 2. If the result of this determination is that the extracted spot information position in not within the prescribed range from the terminal apparatus 2, the spot detection processing returns to the processing of step S21. If, however, the result of the determination is that the spot information position is within the prescribed range from the terminal apparatus 2, control of spot detection processing transfers to step S24.

The above-noted determination processing is performed, for example, by pre-specifying a detection criterion of being within several hundred meters, and by determining whether the distance between the position of the terminal apparatus 2 and the spot information position is within this allowable distance. The tolerance range can be set by the service provider, and can alternatively be set by the user when inputting attribute information.

As the processing of step S24, the CPU 1a of the server apparatus 1 sends a control signal to the terminal apparatus 2 which gives notification that there is a stored spot information position in the vicinity of the position of the terminal apparatus 2. This completes the processing of step S24, at which point spot detection processing control transfers from step S24 to step S25.

Figure 11:
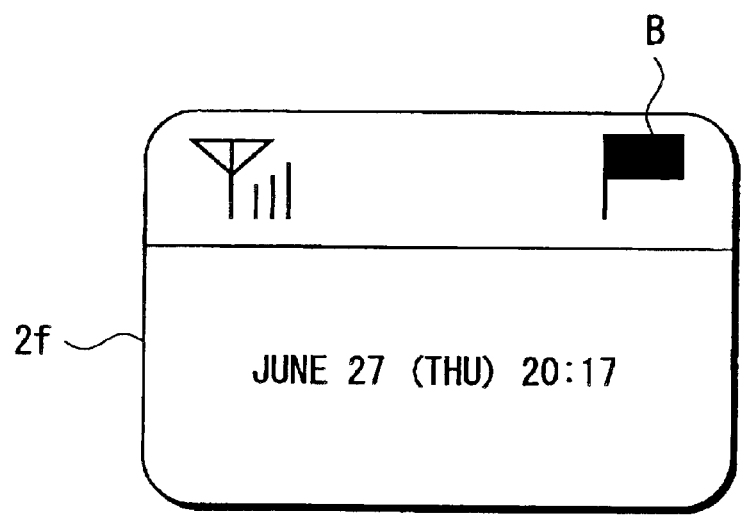
FIG. 11 is a schematic representation illustrating a detection flag according to an embodiment of the present invention.

As the processing of step S25, the CPU 2a of the terminal apparatus 2 controls the display output section 2f so as to display a detection flag B such as shown in FIG. 11, thereby notifying the user that there is a nearby spot information location. In response to a user request, the CPU 2a of the terminal apparatus 2 controls the display output section 2f so as to output an electronic map with an indicator displayed at the spot information position. This completes the processing of step S25, at which point control of spot detection processing returns to the processing of step S21.

In the processing of the above-noted step S25, it is desirable that the user be allowed to operate the operation input section 2e so as to scroll the electronic map, enabling the user to refer to the geography in the region surrounding the spot information position.

Although in the above-noted spot detection processing, only the spot information corresponding to the sent user ID was the target for the detection, it will be understood that it is possible for this to include spot information stored by another user. More specifically, for example, spot information can be grouped between friends and a determination can be made in the case in which there is any that is close to the position of the current terminal apparatus 2 and also which has the public/private setting set to public. By adopting such a configuration, it is possible for a user to easily head for a location other than locations that he or she has directly stored.

The above-noted spot detection processing can also be applied in the case of a three-dimensional electronic map, and in the case in which, for example, the position of the terminal apparatus 2 and spot information position are close as seen from the height direction, it is possible to perform the above-noted processing and display a three-dimensional electronic map on the display output section 2f.

Additionally, in the above-noted spot detection processing, the case described is one in which the server apparatus 1 detects the position at which the user exists, determines whether or not there is spot information stored in the region of the detected position, and if so makes notification. It will be understood, however, that it is further possible in the above-noted spot detection processing to have the server apparatus 1 perform a determination whether or not stored default information in the region of the detected position has been updated by the service provider or by the electronic map creator (for example, changes in telephone numbers or store names), and if it had been updated, to notify the user of this by sending a message such as "Information has changed. Update now?" In this case, in the case in which there is coincidence between the position at which default information is stored and the position at which spot information is stored, it is desirable that the server apparatus 1, in response to a user request, automatically or by a manual operation by the user, perform information updating. Additionally, it is possible to have the server apparatus 1 refer to user attribute information stored within the spot information database 1f so as to identify the user, and to notify only specific users related to specific default information when the default information has been changed. According to such processing, it is not only possible for the user to maintain the spot information in the most update condition, but also possible for the service provider provide a special service with respect to users viewing updated content, thereby enabling the providing of new services.

Additionally, although in the above-noted spot detection processing the terminal apparatus 2 detects the position of the user and performs execution, so that the user is in a so-called passive role at the start of the processing, it is alternatively possible to input keywords expressing a place such as "Central Park," or address or position information, in response to which detection is made of spot information stored in the region of the location indicated by the input content, so that the user is in an active role in the starting of this processing. In this case, the server apparatus 1 detects spot information stored by the user himself or herself, and also detects user spot information of other users that is set to "public," and performs display control of the display output section 2f of the terminal apparatus 2 so as to display the detected spot information and the electronic map in the region near the detected spot information. According to such processing, it is possible for the user to collect information regarding regions that the user has not actually visited by referring to spot information stored by other users, thereby being able to refer to the information when going to that location.

Spot Information Exchange Processing

Referring to the flowchart of FIG. 12, the operation of the information processing system when executing spot information exchange processing is as follows.

Figure 12:
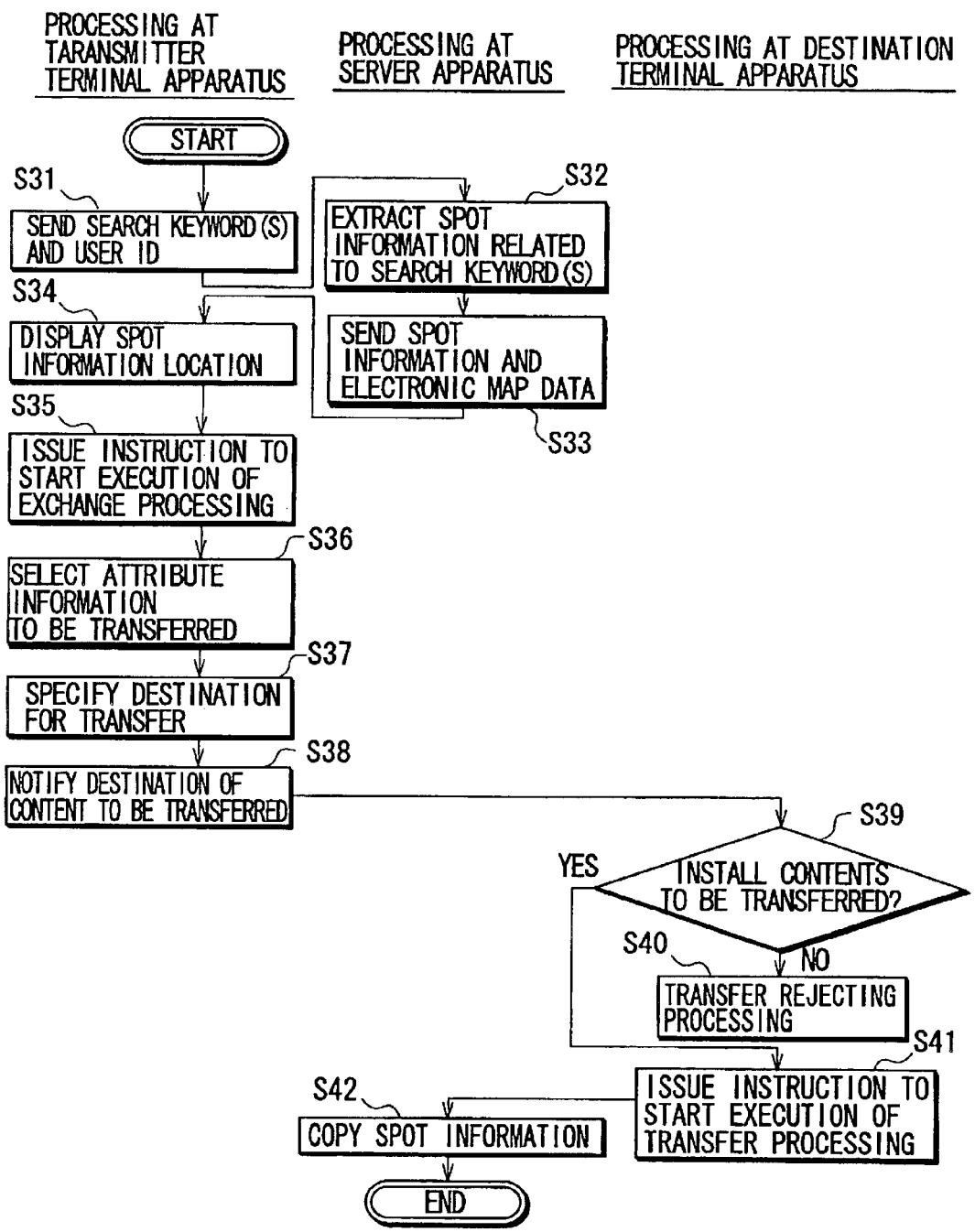
FIG. 12 is a flowchart showing the spot information exchange processing operation according to the information processing system shown in FIG. 1.

The flowchart of FIG. 12 shows the processing that starts after the user performs the processing of step S1 through step S7 for the above-described storing processing, when the user operates the operation input section 2e and clicks on a "keyword input" icon display on the service screen, at which point the processing control transfers to step S31.

As the processing of step S31, the CPU 2a controls the display output section 2f so as to display a keyword search screen. When the keyword search screen is displayed, the user operates the operation input section 2e so as to input a search keyword to the keyword search screen, and press a Start Search button. When the Start Search button is pressed, the communication controller 2d of the terminal apparatus 2 sends the user ID and the search keyword to the server apparatus 1 via the electronic network. This completes the processing of step S31, at which point control of exchange processing transfers from step S31 to step S32.

Figure 13:
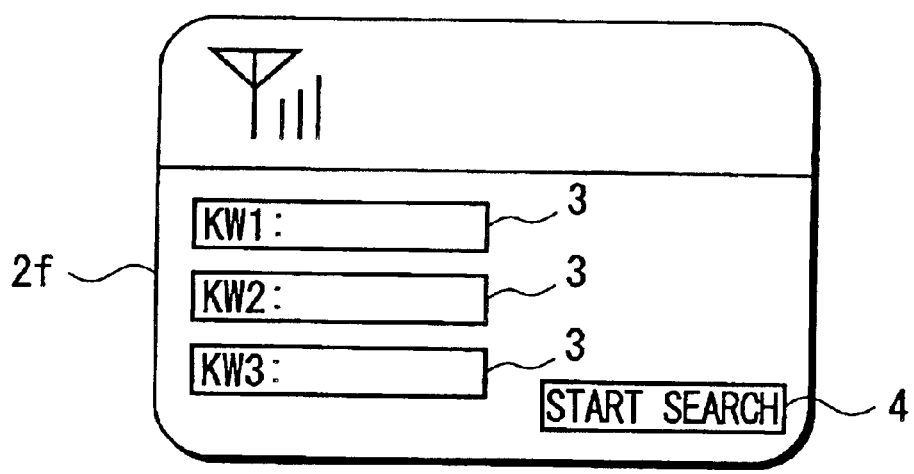
FIG. 13 is a schematic representation showing a keyword search screen according to an embodiment of the present invention.

The above-noted keyword input screen, as shown in FIG. 13, has plurality of keyword input boxes 3 so as to enable searching on a plurality of input keywords, and a Start Search button 4 at the bottom of the screen for starting the execution of the search.

As the processing of step S32, the CPU 1a of the server apparatus 1 extracts from the spot information database 1f spot information stored by the user corresponding to the sent user ID, and then further extracts from the extracted spot information related to the search keyword or keywords. The CPU 1a extracts from the electronic map information database 1e electronic map data in which the extracted spot information is included. This completes the processing of step S32, at which point control of the exchange processing transfers from step S32 to step S33.

As the processing of step S33, the communication controller 1d sends the extracted spot information and electronic map data to the terminal apparatus 2 via the electronic network. This completes the processing of step S33, at which point control of the exchange processing transfers from step S33 to step S34.

As the processing of step S34, the CPU 2a of the terminal apparatus 2 controls the display output section 2f so as to display the spot information and electronic map data sent from the server apparatus 1. This completes the processing of step S34, at which point control of the exchange processing transfers from step S34 to step S35.

When performing the processing of step S34, a Detail button, which gives an instruction to display the spot information attribute information, an Exchange button, which gives an instruction to transfer spot information to another user, and a Return button, which gives an instruction to return to the immediately previous processing, are assigned to the operation input section 2e.

In the above-noted processing of step S34, the CPU 2a of the terminal apparatus 2, similar to as shown in the electronic map of FIG. 5, displays an indicator at a position corresponding to the spot information location. In this case, however, if there is a plurality of spot information, the CPU 2a, before displaying the electronic map, displays the names of the spot information and the user select a name by operating the operation input section 2e. According to the selected name, the CPU 2a displays the place of spot information.

As the processing of step S35, the user presses the "Exchange" button assigned to the operation input section 2e so as to issue an instruction to the terminal apparatus 2 to execute exchange processing of spot information. When the "Exchange" button is selected, the CPU 2a of the terminal apparatus 2 controls the display output section 2f so as to display a verifying message such as "Transfer data no. 1011?" When this message is displayed, the user operates the operation input section 2e so as to press the OK button. This completes the processing of step S35, at which point control of the exchange processing transfers from step S35 to step S36.

As the processing of step S36, the CPU 2a of the terminal apparatus 2 controls the display output section 2f so as to display a message that prompts the user to specify which should be transferred among attribute information included in spot information selected in the processing of step S35, and also to display the attribute information included in the spot information. When this message is displayed, the user operates the operation input section 2e so as to specify the attribute information to be transferred. This completes the processing of step S36, at which point control of the exchange processing transfers from step S36 to step S37.

As the processing of step S37, the CPU 2a of the terminal apparatus 2 controls the display output section 2f so as to display a message that prompts the input of an e-mail address as the transfer address. When this message is displayed, the user operates the operation input section 2e so as to input the e-mail address as the transfer address. This completes the processing of step S37, at which point control of the exchange processing transfers from step S37 to step S38.

As the processing of step S38, the CPU 2a of the terminal apparatus 2 sends information such as "Spot information sent from Mr. XX. Install now?" to the e-mail address input by the user. This completes the processing of step S38, at which point control of the exchange processing transfers from step S38 to step S39.

At this point, rather than attaching the data to be transferred to the above-noted e-mail, only the spot information user ID and attribute information to be sent (in the case in which the transfer enable/unable setting is made, only attribute information which is set for transfer enable) is attached. By doing this, it is possible to prevent trouble arising when a user not desiring the transfer of spot information is sent electronic map data or image data having a large data volume. It is also possible to perform quick transfer of spot information, even in cases in which the bandwidth of the electronic network is small.

As the processing of step S39, the destination user receives the e-mail and determines whether or not to install the spot information by referring to the received e-mail. In the case in which the spot information is not to be installed, the destination user performs, as the processing of step S40, exchange-refusing processing to send e-mail such as "Installation of spot information is refused." to the terminal apparatus 2 of the transmitter. On the other hand, in the case in which the spot information is to be installed, the destination user gives an instruction to start execution of the installation to the user's own terminal apparatus 2 as the processing of step S41. When the instruction is given to start installation, the communication controller 2d of the destination terminal apparatus 2 sends a control signal to start the execution of the installation to the server apparatus 1. This control signal includes spot information ID number and information regarding the attribute information to be disclosed. This completes the processing of step S41, at which point control of the exchange processing transfers from step S41 to step S42.

As the processing of step S42, the communication controller 1d of the server apparatus 1 receives the control signal sent from the terminal apparatus 2, and the CPU 1a of the server apparatus 1 extracts from the spot information database 1f spot information corresponding to the ID number of the sent spot information. The CPU 1a copies spot information having attribute information permitting it to be disclosed into the user storage area within the spot information database 1f, enabling the destination user to make use of the transferred spot information. When this is done, the CPU 1a assigns a new ID number to the copied spot information, and notifies the user of the destination of this ID number. This completes the processing of step S42, thereby completing the overall series of steps for exchange processing.

It will be understood that rather than copying actual spot information to be transferred it is possible to record only the spot information ID number into another user's storage area. According to this configuration, it is possible to minimize the growth in memory capacity required for the spot information database.

Although in the above-described embodiment, the description was for the case in which spot information is exchanged via e-mail, it is alternatively possible to use a wireless communication means such as Bluetooth® or the like to perform direct exchange of spot information between terminal apparatuses 2. In this case, the user operates the operation input section 2e of the terminal apparatus 2 so as to input the telephone number, IP address, or device ID or the like of the user terminal apparatus 2 to which spot information is to be sent. It is desirable that whether spot information is to be sent directly or via a server apparatus 1 indirectly be specifiable by the user. In the above-noted transfer processing, rather than sending the spot information itself, the spot information ID number are exchanged.

As is clear from the detailed description above, in an information processing system according to an embodiment of the present invention, because the configuration is such that the server apparatus 1 has a spot information database 1f which stores information with regard to arbitrary locations in the electronic map data, and it is possible to view information stored in the spot information database 1f on the terminal apparatus 2 via an electronic network, it is possible for a user to store information regarding an arbitrary location on an electronic map into the spot information database 1f of the server apparatus 1 via the electronic network, and to specify search conditions for viewing information stored in the spot information database 1f later, thereby enabling the provision of an electronic map service that matches the style of the user.

In the information processing system according to an embodiment of the present invention, because the server apparatus 1 is configured so that when a user exists in the vicinity of the spot stored in the spot information database 1f, notification of this fact is made to the user, it is possible for a user to reliably reach the stored location, even in the case in which the user has forgotten information regarding the location that is stored in the spot information database 1f.

Additionally, in the information processing system according to an embodiment of the present invention, because the server apparatus 1, in accordance with an instruction from the terminal apparatus 2, transfers spot information stored in the spot information database 1f between users, it is possible for the user to obtain via the terminal apparatus 2 a large amount of beneficial information, in addition to just the information provided by the service provider.

Finally, it should be noted that the foregoing embodiment is merely an exemplary descriptive form of the present invention, to which the present invention is not restricted, and that the present invention can take other various forms, within the scope of the technical concept thereof, but different from the foregoing described embodiments. It will be understood that a person skilled in the art can, based on an embodiment of the present invention, make other embodiments, and such embodiments and operating technologies are encompassed by the present invention.

What is claimed is:

1. An information processing system, comprising:
 a terminal apparatus operable to acquire position information relating to a position of the terminal apparatus and to transmit information; and
 a server apparatus, including:
 an electronic map information database into which is stored electronic map data;
 electronic map assignment means operable to refer to position information sent from the terminal apparatus, and to extract from the electronic map information database electronic map data mapping an area including a vicinity of the position at which the terminal apparatus is located, and to transmit the extracted electronic map data to the terminal apparatus; and
 a spot information database operable to store information received from the terminal apparatus regarding an arbitrary location within the area mapped by the extracted electronic map data, the information regarding the arbitrary location including an identification number, the spot information database being further operable to link information received before from the terminal apparatus with information received currently regarding the arbitrary location and to link the information received currently with information received thereafter from the terminal apparatus.

2. An information processing system as claimed in claim 1 wherein the spot information database is further operable to link the before received information and the after received information with the currently received information using the respective received identification numbers.

3. An information processing system as claimed in claim 1 wherein the spot information database is further operable to store at least one of a date and a time in connection with information regarding respective ones of the arbitrary locations.

4. An information processing system as claimed in claim 1 wherein the spot information database is further operable to store position information relating to a position of the terminal apparatus in connection with the information received from the terminal apparatus regarding the arbitrary location.

5. An information processing system as claimed in claim 1 wherein the spot information database is further operable to store a series of position information relating to respective positions of the terminal apparatus at respective different times.

6. An information processing system as claimed in claim 5 wherein the spot information database is operable to store the position information in connection with storing at least one of a date stamp corresponding to a date, and a time stamp corresponding to a time, at which the position information is acquired by the terminal apparatus.

7. A terminal apparatus, comprising: position detecting means operable to acquire information for determining a position of the terminal apparatus;
displaying means operable to display the position of the terminal apparatus in relation to electronic map data obtainable from an electronic map information database associated with a server remote from the terminal apparatus;
input means operable to specify an arbitrary location mapped by the electronic map data, to transmit information regarding the arbitrary location to the remote server for inclusion in a spot information database associated with the server and to transmit to the remote server a respective identification number with the information regarding each arbitrary location; and
extracting means operable to request from the remote server information regarding the arbitrary location which satisfies an input search condition.

8. A terminal apparatus as claimed in claim 7 wherein the input means is further operable to transmit at least one of a date and a time of transmitting the information regarding the arbitrary location to the remote server.

9. A terminal apparatus as claimed in claim 8 wherein the input means is further operable to transmit at least one of a date and a time of acquiring information regarding a position by the terminal apparatus.

10. A method for processing information, comprising:
acquiring at a server position information regarding a position of a terminal apparatus remote from the server;
referring to the position information, extracting electronic map data mapping an area including a vicinity of the position of the terminal apparatus, and sending the extracted electronic map data from the server to the terminal apparatus;
receiving information regarding an arbitrary location in the area mapped by the extracted electronic map data from the terminal apparatus, the information regarding the arbitrary location including an identification number; and
storing the information regarding the arbitrary location in a database associated with the server while linking information received before from the terminal apparatus with information received currently regarding the arbitrary location and linking the information received currently with information received thereafter from the terminal apparatus.

11. A method of processing information as claimed in claim 10 wherein the linking as performed using the respective received identification numbers.

12. A method of processing information as claimed in claim 11 further comprising storing at least one of a date and a time in connection with information regarding a respective one of the arbitrary locations.

13. An information processing system comprising:
a terminal apparatus operable to detect position information relating to a position of the terminal apparatus and to transmit the position information at a predetermined time interval; and
a server apparatus having a spot information database storing each of a series of spot information in connection with respective identification numbers, the spot information including position information received from the terminal apparatus, at least some of the spot information being linked as spot information transmitted before and spot information transmitted after given spot information.

14. An information processing system as claimed in claim 13 wherein the spot information further includes at least one of a date and a time at which the position information is transmitted by the terminal apparatus.

15. An information processing system as claimed in claim 13 wherein the spot information further includes at least one of a date and a time at which the position information is acquired by the terminal apparatus.

16. An information processing system as claimed in claim 13 wherein the server apparatus further includes an electronic map information database storing electronic map data, and
the spot information database further includes an electronic map identification number specifying the electronic map data corresponding to the position information received from the terminal apparatus.

17. An information processing system as claimed in claim 16 wherein the server apparatus is operable to transmit spot information stored in the spot information database and electronic map data stored in the electronic map information database corresponding to the electronic map identification number for the stored spot information to a second terminal apparatus.

18. An information processing system as claimed in claim 17 wherein the server apparatus is further operable to transmit notification information to the second terminal apparatus when the server apparatus fails to receive the position information from the terminal apparatus after passage of the predetermined time interval.

19. A server apparatus comprising:
an electronic map information database into which electronic map data is stored;
electronic map assignment means operable to refer to position information acquired by and sent by a terminal apparatus, and to extract from the electronic map information database electronic map data mapping an area including a vicinity of a position at which the terminal apparatus is located, and to transmit the extracted electronic map data to the terminal apparatus; and a spot information database operable to store each of a series of spot information received from the terminal apparatus in connection with respective identification numbers, the spot information including at least one of position information and information regarding an arbitrary location, at least some of the spot information being linked as spot information transmitted before and spot information transmitted after given spot information.

20. A server apparatus as claimed in claim 19 wherein the server apparatus is further operable to extract information stored in the spot information database in response to a request including a search condition received from the terminal apparatus, and to transmit the extracted information to the terminal apparatus.

21. An information processing system including the server apparatus according to claim 19, and including a terminal apparatus operable to acquire and send position information, wherein the server apparatus is operable to transmit prescribed information to the terminal apparatus in response to determining that the terminal apparatus is within a prescribed range of a particular one of the arbitrary locations for which information is stored in the spot information database.

22. A server apparatus comprising:
a spot information database operable to store each of a series of spot information received from a terminal apparatus in connection with respective identification numbers, the spot information including at least one of position information and information regarding an arbitrary location, at least some of the spot information being linked as spot information transmitted before and spot information transmitted after given spot information.

23. A server apparatus as claimed in claim 22 further comprising
an electronic map information database into which electronic map data is stored, wherein
the spot information stored in the spot information database includes position information received from the terminal apparatus and an electronic map identification number specifying electronic map data, the electronic map data corresponding to the stored position information.

24. The server apparatus as claimed in claim 23 wherein the server apparatus is further operable to transmit, to a second terminal apparatus, the spot information stored in the spot information database and the electronic map data specified by the electronic map identification number stored in the spot information database.

25. The server apparatus as claimed in claim 24 wherein the server apparatus is further operable to transmit notification information to the second terminal apparatus when the server apparatus fails to receive position information transmitted from the terminal apparatus after passage of the predetermined time interval.

26. An information processing program to be executed by a computer, comprising the steps of:
acquiring at a server apparatus position information regarding a position at a predetermined time interval of a terminal apparatus remote from the server apparatus; and
storing a series of spot information received from a terminal apparatus in connection with respective identification numbers, the spot information including at least position information and time and date information of the position information, at least some of the spot information being linked as spot information before and spot information after given spot information.

27. A computer-readable storage medium having recorded thereon an information processing program to be executed by a computer, wherein the information processing program comprises the steps of:
acquiring at a server apparatus position information regarding a position at a predetermined time interval of a terminal apparatus remote from the server apparatus; and
storing a series of spot information received from a terminal apparatus in connection with respective identification numbers, the spot information including at least position information and time and date information of the position information, at least some of the spot information being linked as spot information before and spot information after given spot information.

* * * * *

UNITED STATES PATENT AND TRADEMARK OFFICE
CERTIFICATE OF CORRECTION

PATENT NO.    : 6,836,727 B2
DATED         : December 28, 2004
INVENTOR(S)   : Hisayuki Kunigita It is certified that error appears in the above-identified patent and that said Letters Patent is hereby corrected as shown below:

Column 18,
Line 9, "as" should read -- is --.

Column 19,
Line 17, after "claim 19" delete ",".

Signed and Sealed this

Twenty-sixth Day of April, 2005

JON W. DUDAS
*Director of the United States Patent and Trademark Office*